United States Patent
Ribardi et al.

[11] Patent Number: 6,036,751
[45] Date of Patent: Mar. 14, 2000

[54] SYSTEM FOR DEPRESSURIZING, FILTERING, AND NOISE SUPPRESSION OF HIGH PRESSURE PNEUMATIC VESSELS

[76] Inventors: Harris J. Ribardi, 2817 Kingman St., Apt. D, Metairie, La. 70006; Larry Joe Osburn, P. O. Box 1813, Iowa, La. 70647

[21] Appl. No.: 09/128,425

[22] Filed: Aug. 4, 1998

[51] Int. Cl.$^7$ .............................. B01D 46/04; B01D 46/46
[52] U.S. Cl. .................................. 95/273; 95/280; 55/283; 55/302; 55/419; 55/420; 55/341.1; 220/203.01; 220/371
[58] Field of Search .............................. 55/283, 302, 312, 55/313, 418, 419, 420, 341.6, 341.1, 334; 95/273, 280; 220/203.01, 203.02, 202, 581, 745, 371, 368

[56] References Cited

U.S. PATENT DOCUMENTS

| | | | |
|---|---|---|---|
| 3,097,936 | 7/1963 | Lincoln | 55/283 |
| 3,251,473 | 5/1966 | Fuhring | 55/341.1 |
| 3,397,515 | 8/1968 | Johnson | 55/302 |
| 3,630,005 | 12/1971 | Reinauer | 55/302 |
| 3,653,188 | 4/1972 | Fisher et al. | 55/283 |
| 3,716,971 | 2/1973 | Reinauer | 55/302 |
| 3,813,853 | 6/1974 | Anderson | 55/283 |
| 3,926,595 | 12/1975 | Bockman | 55/302 |
| 4,113,449 | 9/1978 | Bundy . | |
| 4,227,903 | 10/1980 | Gustavsson et al. | 55/302 |
| 4,445,912 | 5/1984 | Volk et al. | 55/283 |
| 4,759,781 | 7/1988 | Olson . | |
| 4,789,387 | 12/1988 | Nemesi et al. . | |
| 4,844,665 | 7/1989 | Howell . | |
| 4,865,627 | 9/1989 | Dewitz et al. | 55/283 |
| 4,883,510 | 11/1989 | Giusti et al. | 55/334 |
| 5,108,473 | 4/1992 | Hayden . | |
| 5,571,299 | 11/1996 | Tonn . | |
| 5,846,300 | 12/1998 | Johnson | 55/302 |

FOREIGN PATENT DOCUMENTS

| | | | |
|---|---|---|---|
| 1087158 | 4/1984 | U.S.S.R. | 55/283 |

OTHER PUBLICATIONS

Torit Dust Collector catalog brochure form 2DF4/3DF6, dated Jul. 1989 (1 page).
Torit Bin Vent Filters Brochure dated Dec. 1995 (2 pages).

*Primary Examiner*—Duane S. Smith
*Attorney, Agent, or Firm*—Joseph T. Regard, Ltd

[57] ABSTRACT

A pressure vessel venting, dust collecting, and noise silencing system for continuous venting of dry process air during the filling and depressurization of pressure vessels configured to contain, for example, barite or the like, by filtering of vented air through a filter media, with the air discharge being controlled by a pressure sensor actuating a depressurizing regulator valve, located between the vessel and the filter. The present system contemplated a filter which may be cleaned by reverse pulse pressurization or backwash, thereby providing low maintenance filtration while preventing particle emissions into the atmosphere. The present system utilizes a high capacity, stacked filtration medium, which provides a greater filtration, with a surface contact area far in excess of the present systems on the market, which primarily rely upon bag house filtration. The present system thereby provides a low maintenance, efficient, and relatively cost effective system of controlled, filtered, and silenced venting on a process which would otherwise emit particulates into the air, while generating a significant amount of noise in the process.

14 Claims, 5 Drawing Sheets

SYSTEM FOR DEPRESSURIZING, FILTERING, AND NOISE SUPPRESSION OF HIGH PRESSURE PNEUMATIC VESSELS

TECHNICAL FIELD OF THE INVENTION

This invention relates to systems providing filtered, noise dampened venting of high pressure vessels, and in particular to a pressure vessel venting, dust collecting, and noise silencing system for continuous venting of dry process air during the filling and depressurization of pressure vessels containing dry particulate fluid substances including, for example, lime, barite or the like, by filtering of vented air through a filter media, with the air discharge being controlled by a pressure sensor actuating a depressurizing regulator valve, located between the vessel and the filter. The present system contemplates a filter array which may be cleaned by reverse pulse pressurization or backwash, thereby providing low maintenance filtration while preventing particle emissions into the atmosphere.

The present system utilizes a high capacity, stacked filtration medium, which provides a greater filtration, with a surface contact area far in excess of the present systems on the market, which primarily rely upon bag house filtration. The present system thereby provides a low maintenance, efficient, and relatively cost effective system of controlled, filtered, and silenced venting on a process which would otherwise emit particulates into the air, while generating a significant amount of noise in the process.

BACKGROUND OF THE INVENTION

In transferring dry fluid substances such as barite (drilling mud), an air stream generated by a blower is sometimes utilized to force the particulate product from the transport container to the product tanks at the drilling site. As the product is transferred, the air in the product tank must be vented to prevent a high pressure build-up. In order to prevent the emission of particulate product from the atmosphere during this venting, traditionally bag houses have been employed, wherein the vented air passes through a plurality of filter bags which collect the particulates therein. While filter bags remove most of the particulates form the vented air, the technology is relatively old and this means of filtration is not as efficient as other filter media employed in other areas. Many filter bags are often required to vent the quantity of air released during this process, and the bags must be changed frequently. Further, filter bags do not greatly dampen the noise created during the venting process, which can be deafening.

The following patents are considered to have at least some pertinence with regard to the system of the present invention:

| Patent Number | Inventor | Date of Issue |
|---|---|---|
| 5571299 | Tonn | 11/05/1996 |
| 5421846 | Klimczak | 06/06/1995 |
| 5108473 | Hayden | 04/28/1992 |
| 4844665 | Howell | 07/04/1989 |
| 4790865 | DeMarco | 12/13/1988 |
| 4789387 | Nemesi et al | 12/06/1988 |
| 4759781 | Olson | 07/26/1988 |
| 4666472 | Klimczak et al | 05/19/1987 |
| 4445915 | Robinson | 05/01/1984 |
| 4388087 | Tipton | 06/14/1983 |
| 4218227 | Frey | 08/19/1980 |

-continued

| Patent Number | Inventor | Date of Issue |
|---|---|---|
| 4113449 | Bundy | 09/12/1978 |
| 4204849 | Johnston | 05/27/1980 |
| 3733790 | Pierce | 05/22/1973 |
| 3726066 | Colley et al | 04/10/1973 |

U.S. Pat. No. 4,844,665 to Howell teaches a "Portable Industrial Filter System" teaching a filter bag assembly in a housing configured to filter barite or other dry fluid product from vented air generated during transfer of the product to a storage receptacle via blown stream of air generated by a blower, which carries the particles from the tank to the storage receptacle. Howell '665 also teaches the utilization of the same blown air stream utilized to transfer the product in a reverse stream through the filter, to dislodge particles from the filter. Howell is a low pressure system, and it is believed would not work in a high pressure, pneumatic transfer context.

U.S. Pat. No. 5,108,473 issued 1992 teaches a "Dust Collector with Atmospheric Back flush" wherein there is utilized cylindrical, replaceable filter elements which may be cleaned via backflow of pulsed air.

U.S. Pat. No. 5,571,299 issued 1996 teaches a "Dust Collector" comprising stacked, cylindrical filter elements, suspended in a filter housing.

U.S. Pat. No. 3,726,066 teaches a "Dust Collector" contemplates another system utilizing a cylindrical filter system in a housing including cleaning means in the form of a reverse burst of high pressure gas.

U.S. Pat. No. 4,759,781 teaches a "Filter and Dust Collecting Apparatus" utilizing a filter bag including an automatic timing arrangement for cleaning the filters.

U.S. Pat. No. 4,789,387 contemplates a dust collector utilizing cylindrical filter medium, which further utilities a burst from an air compressor for cleaning same.

U.S. Pat. No. 4,113,449 teaches a "Baghouse Cleaning Method" in a high pressure dust collector system.

Thus, while the prior art has contemplated backwashing filters, including cleaning filter bags via reverse flow, and the utilization of cylindrical stacked filters for air filtration is not entirely new, it would appear that the prior art fails to contemplate the system and improvements of the present invention. The deficiencies in the prior art and methods for venting process air and depressurizing high pressure vessels lie in the need for continuous venting and dust removal and silencing the noise associated with venting high pressure vessels. While the above noted technologies may be useable to some degree in a low pressure scenario, it is believed that said systems do not provide the capabilities and operational reliability and ease of use made possible by the present invention, especially when implemented in a high pressure system, as is the preferred embodiment of the invention.

GENERAL SUMMARY DISCUSSION OF THE INVENTION

Unlike the prior art, the present invention provides a system for venting and depressurizing high pressure pneumatic vessels with filtration and noise suppression of the vented air, in an efficient, safe, reliable, and cost-effective manner. Further, unlike other systems, the present system is configured to be relatively self-maintaining, and is configured to be installed at an installation for an extended period of time, requiring only nominal operational input from personnel.

The preferred embodiment of the present invention contemplates a housing mounted to the exhaust area of a vessel, the housing mounted such that a depressurization valve is situated therein for automatically controlling the venting of the vessel upon reaching a desired pressure, the housing further including a filter assembly configured to contain vertically stacked filter elements configured to collect dust or other particulates in the vented air, a high pressure relief valve, and a pulse air solenoids to, in effect, backwash the filters periodically and automatically utilizing pulsed, compressed air.

Upon venting from the vessel, the dust laden air enters the lower housing and moves upward, where particulate matter is trapped on the surface of the filter media, which particles are expelled from the internal filter by use of a compressed, reverse air pulse.

An embodiment of the present invention contemplates regulating air flow to the filter media by the use of a pressure sensor which actuates the regulator valve. Air passing through the filter media is silenced by the air flow changes which take place inside of the housing prior to being released. A further embodiment of the present invention may include an ID fan attached to the clean air outlet to clean the air discharge outlet, if necessary.

An object of the present invention is to provide a system which overcomes the limitations of prior art systems for venting air from high pressure vessels, namely, the amount and speed of ventilation, high maintenance, expense, and down time, and lack of capabilities to handle high pressure systems.

Another object of the invention is to provide a processing apparatus which will operate continuously to vent filtered air during the filling of pressure vessels.

Still another object of the invention it so provide a process apparatus which is capable of handling high pressures associated with the pneumatic transfer of granulated or powdered material.

Lastly, it is an object of the present invention to provide an system which is capable of venting high volumes of air from pressure vessels as they are depressurized.

BRIEF DESCRIPTION OF DRAWINGS

For a further understanding of the nature and objects of the present invention, reference should be had to the following detailed description, taken in conjunction with the accompanying drawings, in which like parts are given like reference numerals, and wherein.

DETAILED DISCUSSION OF THE INVENTION

Figure 1:
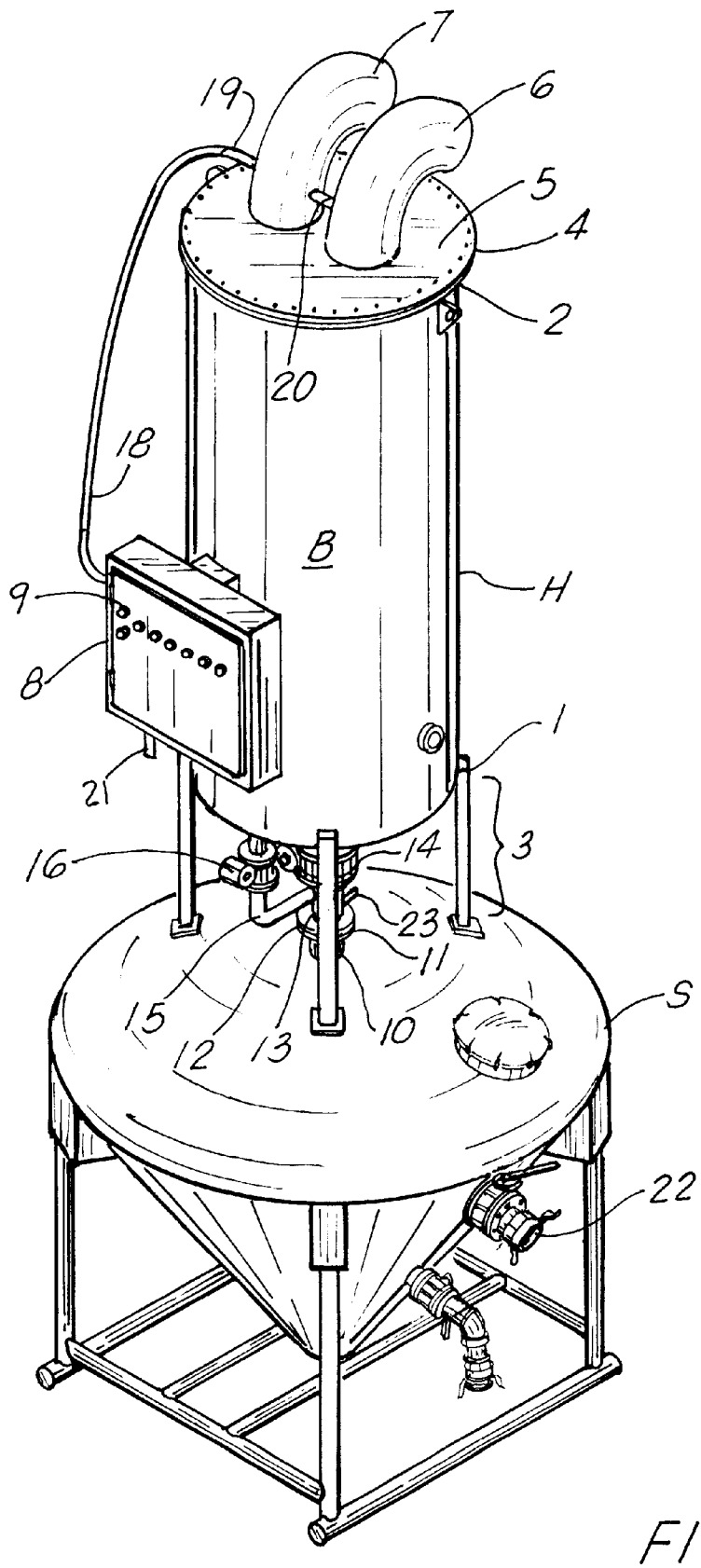
FIG. 1 illustrates an isometric view of the system of the present invention, showing the filtering apparatus mounted upon a surge tank.
Figure 2:
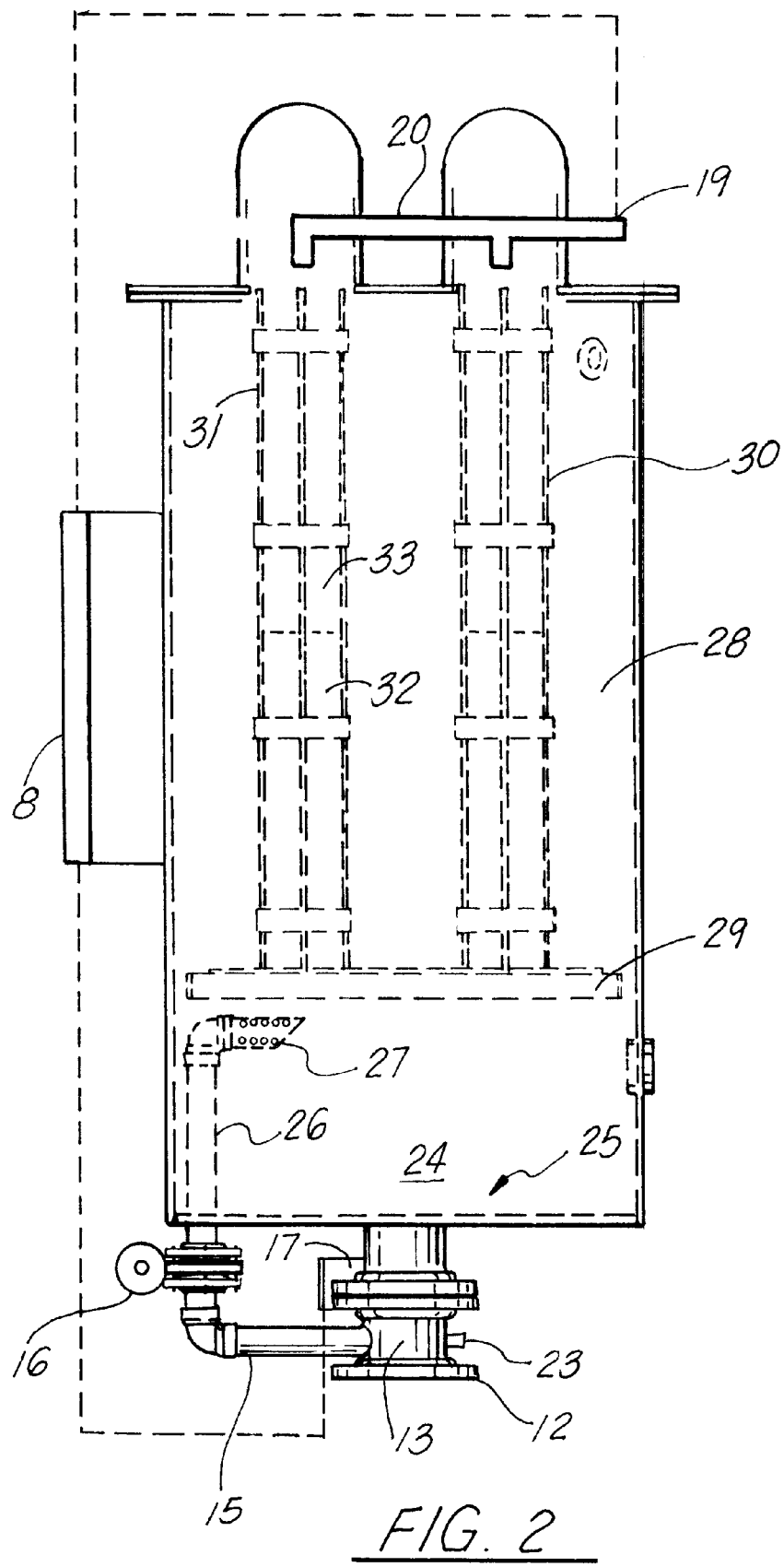
FIG. 2 illustrates a cut-away view of the filtering apparatus of FIG. 1, illustrating in phantom the filter canister holders and initial vent pipe

Referring to FIGS. 1 and 2, the preferred embodiment of the present invention comprises a housing H configured to engage a high pressure tank, such as surge tank S, the housing H having a body B having first 1 and second 2 ends, the first end 1 having legs 3, the second end having a flange 4 configured to engage lid 5, which includes first 6 and second 7 vents for venting filtered air therefrom.

Mounted along the side of the housing is a control panel 8 having controls 9 to control the system, the detailed operation of which will be more fully disclosed infra.

Situated at the top of the surge tank S is a vent 10 having a flange 11 thereupon, which communicates with the housing H of the present invention via mounting flange 12 formed at the terminus of main vent tube 13 which leads to intake chamber 24 via main intake aperture 25, and is regulated by main actuator 17 at flange 14. The actuator currently utilized in the working prototype is a TK130DA model by Trial Controls, Inc. of Cincinnati, Ohio U.S.A.

Communicating with vent tube 13 between the mounting flange 12 and actuator 17 is high pressure vent tube 15, which has somewhat of a lesser diameter (for example, less than ½) than main vent tube 13, and which also communicates with intake chamber 24 and is regulated by actuator 16, the portion 26 of vent tube within intake chamber 24 terminating in a baffled vent 27 to provide noise reduction and regulated venting therefrom. In the present, working embodiment of the invention, the high pressure vent tube is a two inch diameter tube, and the main vent tube is a six inch diameter tube. As will be discussed further, main vent tube 13 may include pressure sensor 23 to monitor pressure condition and for controlling actuators 16, 17.

Figure 3:
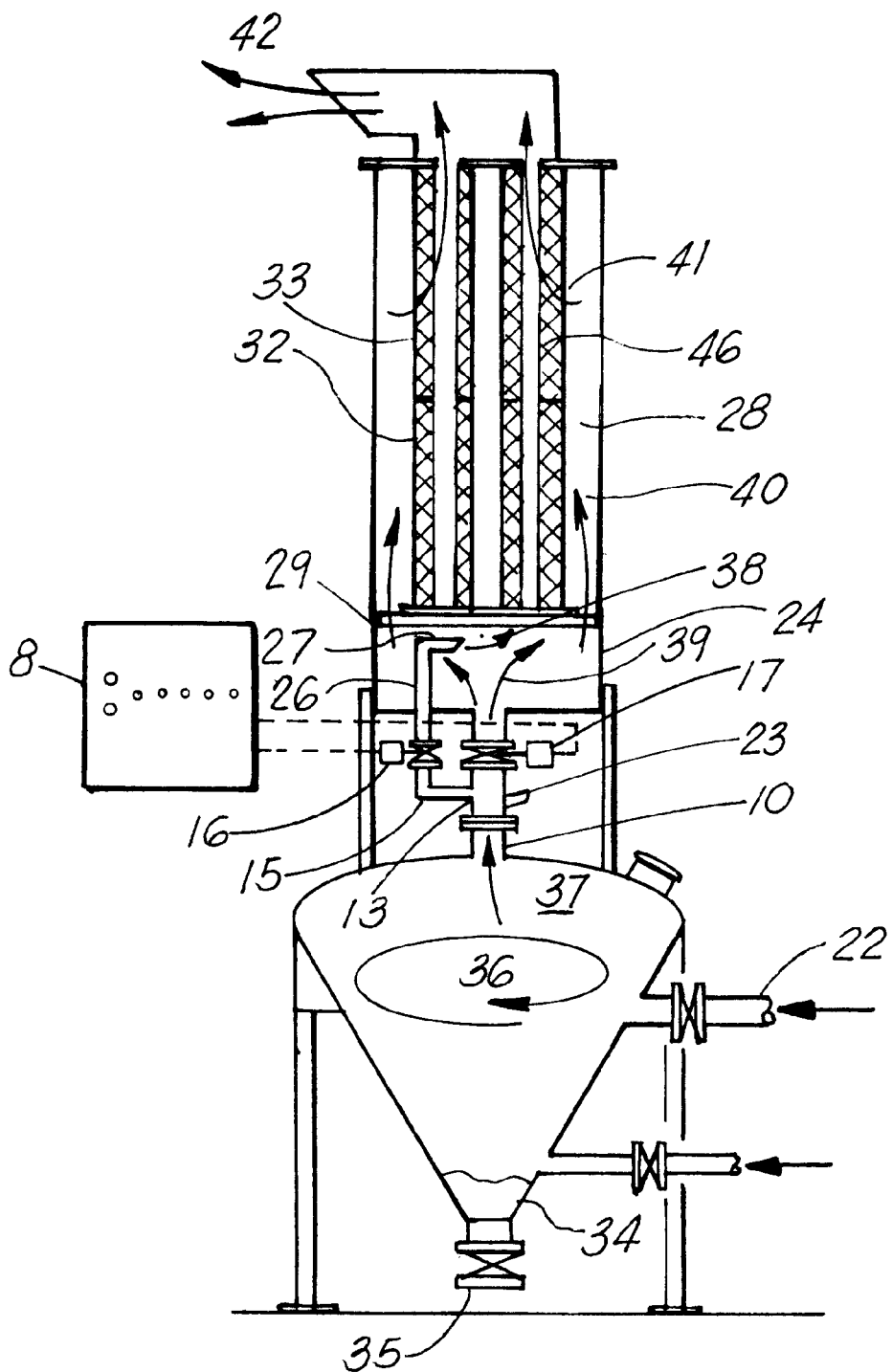
FIG. 3 illustrates a cross-sectional view of the apparatus of FIG. 1, illustrating an exemplary flow of air discharge through the surge tank and filtering apparatus.

Continuing with FIG. 2, a base member 29 separates the intake chamber from the adjacent filter chamber 28, although fluid may pass through the base member via spaces formed therethrough. As shown, the filter chamber has situated therein a filter array consisting of first 30 and second 31, open filter sleeves configured to retain first 32 and second 33 stacked filters securely therein, yet expose the filter material forming the outer surface of the filters to the filter chamber 28, the stacked filters configured to engage at their respective ends to form a fluid impermeable seal to prevent leakage therebetween; likewise, the first filter 32 is configured to engage base member 29 so as to form a fluid impermeable seal therebetween to prevent leakage. Each of the filters has a longitudinal core 46 therein, and the cores align with regard to the stacked filters, as shown in FIG. 3.

Continuing with FIGS. 1 and 2, control panel 8 controls high pressure hose 18 which runs to backwash vent 20 communicating via coupling 19, which vent jets high pressure air into the longitudinal core of the filters to form reverse pressure pulses, in order to clean the filters, as will be more fully discussed infra. Compressed air to drive said backwash vent 20 may be provided to the control panel 8 via coupling 21, which may be controlled via pneumatic, mechanical, or electronically actuated valves controlled via control panel 8, which includes monitored or timed control, and a manual control override for flexibility of use.

The filters utilized in the present working embodiment of the invention are model 8PP-42057-00 TORIT brand ultra web cycled filters, having a 9.5 inch inner diameter and 13.5 inch outer diameter.

Further, the control panel 8 includes circuitry to monitor, via pressure sensor 23, the pressure in main vent tube 13, and control venting via main 17 and high pressure 16 actuators, as will be more fully disclosed below.

Figure 4:
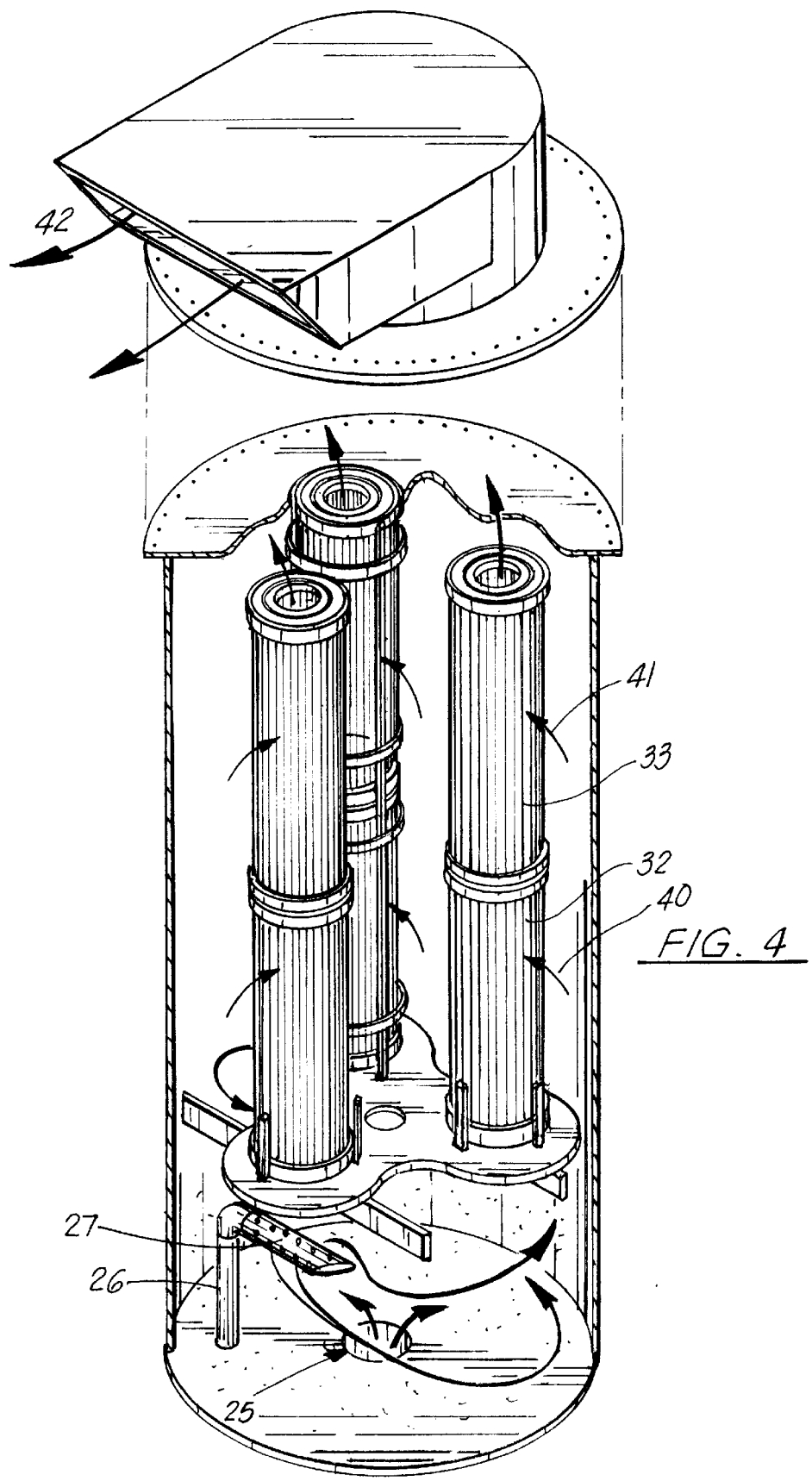
FIG. 4 illustrates a cut-away view of the apparatus of FIG. 3, further illustrating a exemplary flow of air discharge through the surge tank and filtering apparatus.
Figure 5:
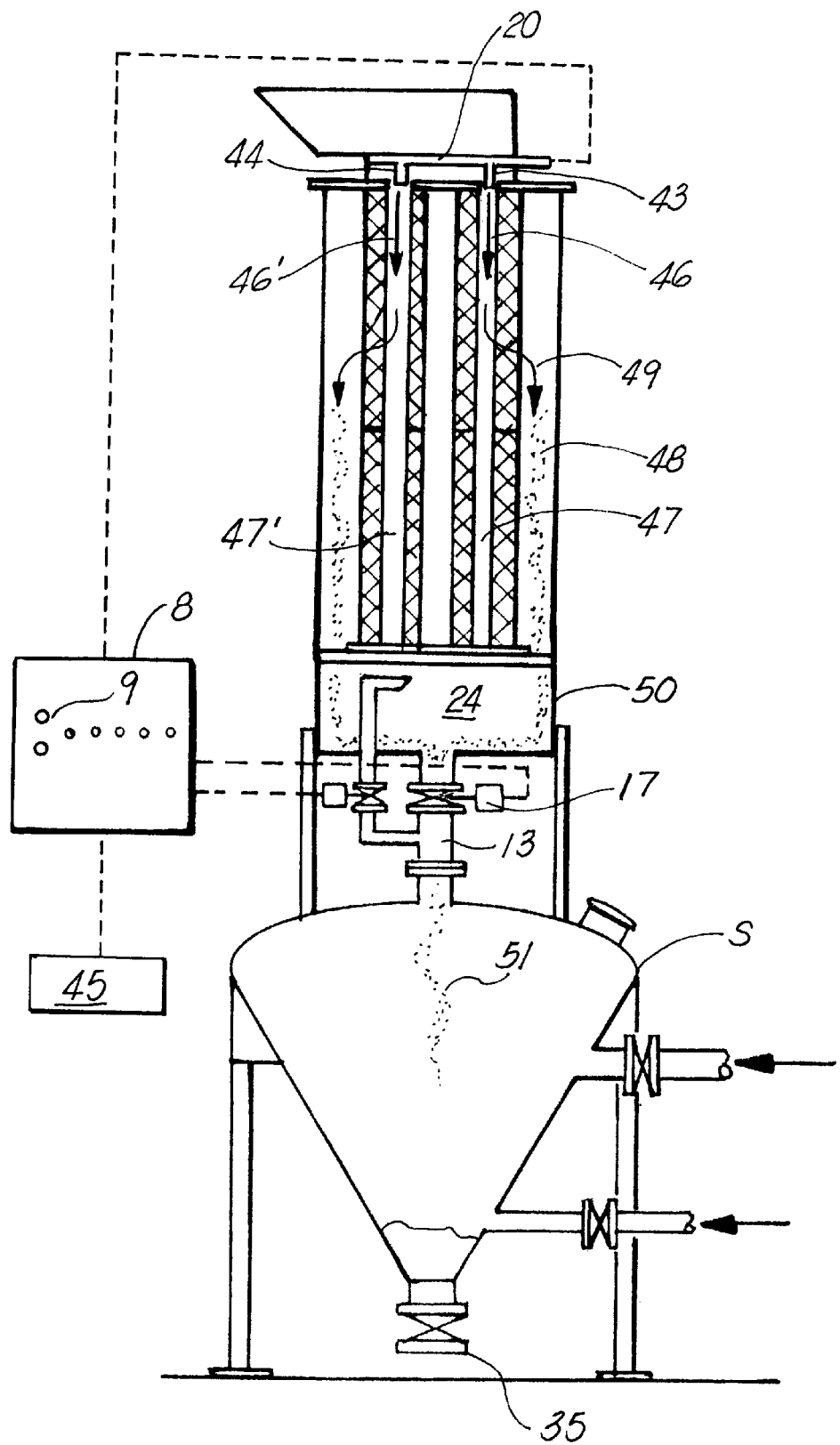
FIG. 5 illustrates a cross-sectional view of the apparatus of FIG. 3, illustrating the filter cleaning of the present invention, wherein there is provided controlled, pulse pressurized air to the core of the filter array, driving particulates from the outer filtration surface of the filters.

In use, referring to FIGS. 3, 4 and 5, a high pressure hose running from the vent of a production tank being filled with product is engaged to vent hose coupling 22, where the product 36 is directed 37 through vent 10 where pressure sensor 23 relays pressure information to control panel 8. Generally, at the start of the cycle, both actuators 16, 17 are closed until selectively opened by controls via the control panel.

The control panel includes circuitry or other pressure determination means to discern the pressure of the main vent tube 13 via pressure sensor 23, and is programmed to open the high pressure vent 15 via actuator 16 if the pressure is over a certain predesignated amount, such as, for exmple, greater than 5 PSI over atmospheric, allowing high pressure 38 venting into intake chamber 24 via intake 26, which includes, as earlier indicated a noise reducing and pressure regulating baffle 27, which may be a simple as a plurality of holes drilled at the end of the pipe forming the intake 26, with the end of the pipe sealed, or perhaps a more conventional muffler or baffle device as is known in the art.

While the high pressure venting is taking place, the control panel continues to monitor the pressure within the main vent tube 13 until it reaches the designated maximum pressure for opening of the main actuator 17, as indicated as an example, 5 PSI or less, wherein the main actuator 17 is opened via controls on control panel, allowing low pressure 39 venting through the larger, main vent 13 to occur into intake chamber 24.

The actuators, which are air actuated, are controlled via control hoses running from the control panel, which includes the monitoring circuitry, as well as electronically actuated valves to send air to the actuators via hoses to control same. It is noted that the system may likewise perform well with a purely air actuated system using conventional controls. It is also noted that the present system, while illustrating automatic functions, may also include manual controls to open and close the actuators as desired via controls on the control panel.

The vented air/particulate mixture passes 40 into the filter chamber 28 through passages formed in the filter chamber base 29, where the air/particulate mixture then passes through, and is filtered 41 by, filters 32, 33, the filtered air then vented 42 into the atmosphere. Once the pressure is reduced to atmospheric, the actuators 16, 17 may then be closed by control panel 8. Any product 34 settled in surge tank may be dumped via dump valve 35.

The present system works remarkably well and relatively quickly as it has been found that the higher pressure (for example, above 5 PSI), which a large surge could destroy the housing and filters, is quickly bled off by the smaller diameter, high pressure vent 15 to a manageable pressure (example 5 psi), wherein the larger main vent tube 13 may be opened. It is the pressure drop from about 5 psi to atmospheric that takes the longest to vent, but with the larger vent tube opened, it is a manageable vent time.

The control panel automates the system, requiring little in the way of operator intervention, unless manual control is desired.

In order to clean and maintain the filters, a backwash vent 20 is provided, which includes jets 43, 44 configured to direct a high pressure air blast 46, 46' into the longitudinal cores 47, 47' formed in the stacked filters, the air blast penetrating 49 the filter material and dislodging particulates 48 upon and within the filter material, which particulates fall 50 into the intake chamber 24, and, with the main actuator 16 opened, may be driven via main vent tube 13 into 51 surge tank S, where it may be disposed of via dump valve The backwash cycle may be controlled via automatic timer, pressure sensor, or manual controls 9 on control panel 8, and the compressed air for driving the jets 43, 44 may be provided by compressor 45, and actuated via electronic, pneumatic, or mechanically actuated valves controlled by control panel. Further, the air blast emanating from jets 43, 44 may be pulsed, as desired.

The invention embodiments herein described are done so in detail for exemplary purposes only, and may be subject to many different variations in design, structure, application and operation methodology. Thus, the detailed disclosures therein should be interpreted in an illustrative, exemplary manner, and not in a limited sense.

What is claimed is:

1. A system for depressurizing a high pressure vessel, comprising:

a housing having a chamber formed therein;

high pressure input means for directing high pressure fluid into said chamber formed in said housing;

low pressure input means-for directing low pressure fluid into said chamber formed in said housing;

actuator means for selectively actuating said high pressure input means or said low pressure input means;

controller means for controlling said actuator means.

2. The system of claim 1, wherein said chamber formed within said housing has formed therein an intake chamber, wherein said high pressure input means and said low pressure input means directs said high pressure and low pressure fluid, and wherein said chamber formed within said housing has formed therein a filtration chamber adjacent to said intake chamber, wherein there is provided filtration means to filter said fluid within said filtration chamber.

3. The system of claim 2, wherein said low pressure input means has a diameter, and said high pressure input means has a diameter which is less than said low pressure input means.

4. The system of claim 3, wherein said high pressure input means has a diameter which is less than half of said low pressure input means.

5. The system of claim 4, wherein said filtration means comprises a filter of filtration material having a longitudinal conduit formed therethrough which communicates with an atmospheric vent, and wherein there is further provided backwash means to clean said filter, comprising means to introduce a high pressure blast of air into said longitudinal conduit, so as to urge particulates adhering to said filtration material away from said filtration material.

6. The system of claim 5, wherein said high pressure input means further comprises noise suppression means.

7. The system of claim 6, wherein said noise suppression means comprises a high pressure vent conduit extending into said chamber formed in said housing said conduit having drilled therethrough a plurality of vent apertures to provide uniform, regulated venting within said chamber.

8. The system of claim 7, wherein there is further provided pressure sensing means to monitor the pressure of the system, and wherein said controller means comprises a controller board comprising electronic monitoring and timer circuitry, said controller board communicating with said pressure sensing means to discern the pressure of the system, said controller board further controlling said actuator means for selectively engaging said high pressure vent means when a high pressure condition exists, and engaging said low pressure vent means when a low pressure condition exists.

9. The system of claim 8, wherein said controller board further controls said backwash means.

10. The system of claim 9, wherein said controller board includes actuated valve means to direct high pressure air to said actuator means and said backwash means, to control same.

11. The method of depressurizing a high pressure vessel, comprising the steps of:
  a. providing:
     a housing having a chamber formed therein;
     input means for inputting a flow of fluid, comprising a high pressure input means for directing high pressure fluid into said chamber formed in said housing, said high pressure input means providing a reduced flow of high pressure fluid into said chamber formed in said housing, and low a separate pressure input means for directing low pressure fluid into said chamber formed in said housing;
     actuator means for selectively actuating said high pressure input means or said low pressure input means;
     controller means for controlling said actuator means;
  b directing a flow of fluid into said input means;
  c. discerning the pressure of said fluid in said input means;
  d. if said pressure is greater than a predetermined amount, directing said fluid through said high pressure input means while preventing flow through said low pressure input means;
  e. if said pressure is less than or equal to a predetermined amount, directing said fluid through said low pressure input means.

12. The method of claim 11, wherein there is included the additional step of providing filters and filtering said fluid to remove particulates therefrom and providing filtered air, and releasing said filtered air to the atmosphere.

13. The method of claim 12, wherein there is included the additional step of cleaning said filters after filtering said fluid.

14. The method of claim 13, wherein there is included the additional step of providing, in association with said high pressure input means, noise suppression means, and there is provided the additional step of passing said high pressure fluid through a noise reduction apparatus prior to introducing said flow into said chamber formed in said housing.

* * * * *